United States Patent
Dalson et al.

[15] 3,676,328

[45] July 11, 1972

[54] REFORMING WITH FIVE PLATINUM RHENIUM CATALYST BEDS

[72] Inventors: Milton H. Dalson, c/o Engelhard Minerals & Chemicals Corp. 497 Delancy St., Newark, N.J. 07105; James P. Gallagher, c/o Atlantic Richfield Co. 400 E. Sibley Blvd., Harvey, Ill. 60426; William C. Pfefferle, c/o Engelhard Minerals & Chemicals Corp. 497 Delancy St., Newark, N.J. 07105

[22] Filed: June 12, 1970

[21] Appl. No.: 45,937

[30] Foreign Application Priority Data

June 20, 1969 Canada...................................054,905

[52] U.S. Cl..............................................208/65, 208/138
[51] Int. Cl..........................................................C10g 35/08
[58] Field of Search....................................208/65, 138, 139

[56] References Cited

UNITED STATES PATENTS

| | | | |
|---|---|---|---|
| 3,392,107 | 7/1968 | Pfefferle | 208/65 |
| 3,415,737 | 12/1968 | Kluksdahl | 208/138 |
| 3,091,584 | 5/1963 | Singer | 208/65 |
| 3,011,965 | 12/1961 | Decker | 208/65 |

*Primary Examiner*—Herbert Levine
*Attorney*—Morton, Bernard, Brown, Roberts & Sutherland, John W. Bekringer, Eugene L. Bernard, Martin J. Brown, James N. Dresser, W. Brown Morton, Jr., John T. Roberts and Malcolm L. Sutherland

[57] ABSTRACT

Naphtha containing from 40 to 60 percent naphthenes, 5 to 25 percent aromatics, 25 to 55 percent paraffins is reformed in a system including five serially arranged reactors having catalyst containing platinum and rhenium supported on a porous, solid base such as alumina. A defined manner of operation regarding reactor inlet temperatures and space velocities is disclosed.

3 Claims, No Drawings

REFORMING WITH FIVE PLATINUM RHENIUM CATALYST BEDS

This invention relates to the catalytic reforming of petroleum naphthas which are of high naphthene content in order to increase their octane number. The naphthas contain from 40 to 60 percent by weight of naphthenes, from 5 to 25 percent by weight of aromatics and from 25 to 55 percent by weight of paraffins. The catalyst used contains platinum and rhenium supported on a porous, solid base, such as alumina, and is disposed in five reactors arranged in series. The processing conditions are maintained such that the first two or three reactors in the series are naphthene dehydrogenation zones and the remaining reactors in the series are paraffin dehydrocyclization zones.

It is known in the art to reform petroleum naphthas in order to increase their octane number by passing them at elevated conditions of temperature and pressure in admixture with hydrogen gas into contact with a reforming catalyst. Among the reforming catalysts which have been proposed is platinum and rhenium supported on alumina. When naphthas are reformed, naphthenes are dehydrogenated to aromatics and paraffins are dehydrocyclized to naphthenes and aromatics. Other reactions also take place.

Certain naphthas are known which contain a relatively high proportion of naphthenes. Such naphthas are exemplified by naphthas derived from Mid-Continent and Gulf Coast crudes, and by certain hydrocrackates, and generally contain from 40 to 60 percent by weight of naphthenes, from 5 to 25 percent by weight of aromatics and from 25 to 55 percent by weight of paraffins. Such naphthas are relatively easy to reform to produce reformate of high octane number. However, the present invention provides a method for reforming such naphthas at low pressure to produce reformate of high octane number with a low rate of catalyst aging, the result being that a reduced amount of the catalyst need be placed in the reforming system and that increased yields of liquid products are obtained.

Still discussing the prior art, it has also been proposed to reform naphtha using a supported platinum catalyst, hydrogen and a plurality of adiabatic, fixed bed reaction zones arranged in series. Each of the plurality (for example, five) of reaction zones has at least one adiabatic, fixed bed catalytic reaction taking place in it and is preceded by at least one heater for heating the hydrocarbon and hydrogen-containing recycle gas being processed. An early portion of the plurality of reaction zones provides at least one naphthene dehydrogenation zone maintained under certain conditions, and a subsequent portion of the plurality of reaction zones defines at least one paraffin dehydrocyclization zone also maintained under certain conditions. Effluent from the last reactor in the series is cooled and passed to a separator from which there is withdrawn liquid reformate and hydrogen-containing gas. Part of this gas is introduced into the first reactor along with fresh feed to be reformed, part of this gas is introduced into the paraffin dehydrocyclization zone along with the effluent from the last reactor in the naphthene dehydrogenation zone, and the remainder of this gas is withdrawn from the reforming system. Reforming in this manner is described in U.S. Pat. No. 3,392,107 to Pfefferle.

The present invention provides an improved process for the catalytic reforming of petroleum naphthas which are of high naphthene content, using five reactors arranged in series, hydrogen being introduced into the first (initial) reactor in the series and additional hydrogen being introduced into the third or fourth reactor in the series.

The petroleum naphtha used is one having a naphthene content of from 40 to 60 percent by weight, an aromatic content of from 5 to 25 percent by weight, and a paraffin content of from 25 to 55 percent by weight.

The catalyst present in the reactors contains platinum and rhenium supported on a porous, solid base, such as alumina. When such a catalyst is used, the reforming process can be operated with a low rate of catalyst aging to produce reformate of high octane number. In general, the catalyst will contain from 0.1 to 3 percent by weight of platinum and from 0.01 to 5 percent by weight of rhenium. The porous, solid base or carrier for the platinum and rhenium can be any of a large number of materials which have heretofore been used in the art as catalyst supports. Thus, the carrier can be, for example, silicon carbide, charcoal or carbon. Preferably, the carrier is an inorganic oxide. A high surface area inorganic oxide is particularly preferred, for example, an inorganic oxide having a surface area of from 50 to 700 square meters per gram. The carrier can be a natural or a synthetically produced inorganic oxide or combination of inorganic oxides. Acidic inorganic oxide supports which can be used are the naturally occurring aluminum silicates, particularly when acid treated to increase the activity, and the synthetically-produced, cracking supports, such as silica-alumina, silica-zirconia, silica-alumina-zirconia, silica-magnesia, silica-alumina-magnesia, and crystalline zeolitic aluminosilicates. Acidic inorganic oxide supports are especially useful in the terminal reactor. Generally, however, the reforming process of this invention is preferably conducted using catalysts having relatively low cracking activity, that is, catalysts of limited acidity. Hence, preferred carriers are inorganic oxides, such as magnesia and alumina.

A particularly preferred catalytic carrier for the purposes of this invention is alumina. Any of the forms of alumina suitable as a support for reforming catalysts can be used. A particularly desirable alumina is one which is characterized by large pore, high area base structure, essentially composed of gamma alumina modifications resulting from the drying and calcination of a mixture of precursor hydrous alumina phases containing about 65 to 95 percent of trihydrate. The preparation of such alumina is described in U.S. Pat. No. 2,838,444. The alumina base can, if desired, contain from 0.3 to 1.5 percent by weight of halogen, such as chlorine or fluorine, preferably from 0.6 to 0.9 percent by weight. Further details concerning the preparation of platinum-rhenium catalysts are set forth in U.S. Pat. No. 3,415,737 to Kluksdahl.

When the catalyst is initially contacted with the naphtha, the platinum and rhenium are preferably sulfided. The platinum and rhenium, when in the form of free metal, can easily be sulfided by contacting the catalyst with hydrogen sulfide or dimethyldisulfide until the catalyst no longer absorbs the hydrogen sulfide or dimethyldisulfide. On the other hand, hydrogen sulfide or dimethyldisulfide can be contacted with the catalyst along with the naphtha at the time when the naphtha is initially introduced, in the event that one wishes to initiate the reforming operation with a catalyst in which the platinum and rhenium are in the form of free metal. When the operation is carried out in this manner, the amount of hydrogen sulfide or dimethyldisulfide introduced is at least about 50 percent, or even at least about 80 percent, of the stoichiometric amount needed to give one atomic weight of sulfur for each atomic weight of total platinum and rhenium in the catalyst. Advantageously, the hydrogen introduced into the reaction system will have admixed with it from 5 to about 100 parts per million by volume of water vapor, preferably from 15 to 50 parts per million by volume of water vapor.

The reforming process of this invention is carried out in a series of five reactors, in each of which a bed of the catalyst is placed. The pressure of the mixture of fresh naphtha feed and hydrogen-containing recycle gas introduced into the first (initial) reactor can vary within the range from 100 to 300 psig.

From 2 to 8 mols of hydrogen per mol of naphtha are introduced into the reforming system as a constituent of the recycle gas. A portion of this hydrogen is introduced into the first reactor. The remainder of this hydrogen is introduced into the third or fourth reactor, or into both the third and fourth reactors with the total amount of the remainder of the hydrogen being introduced into those reactors in any proportion. Preferably, the amount of hydrogen introduced into the first reactor will be between one-third and two-thirds of the total amount of hydrogen introduced into all the reactors. The temperature of the mixture of hydrocarbon and hydrogen introduced into the first reactor will be within the range from 800° to 880° F. The temperature of the mixture of hydrocarbon and hydrogen introduced into the second reactor will be within the range from 820° to 900° F. The temperature of the mixture introduced into the third reactor will be within the range from 820° to 1,000° F. The temperature of the mixture introduced into the fourth and fifth reactors will be within the range from 880° to 1,000° F.

The weight hourly space velocity (WHSV, meaning weight units of fresh naphtha feed per weight units of catalyst per hour) will be within the range from 2 to 6, based upon the total amount of catalyst present in the five reactors. The space velocity in the first reactor will be within the range from 20 to 60, the space velocity in the second reactor will be within the range from 15 to 50, the space velocity in the third reactor will be within the range from 7 to 40 and the space velocity in the fourth reactor will be within the range from 3 to 20, all based upon the weight of fresh naphtha feed.

Also, the total feed (fresh naphtha plus hydrogen-containing recycle gas) introduced into the reactors should not contain more than 20 parts per million by weight of sulfur. Where a guard reactor is used before the first reactor containing the platinum-rhenium catalyst in order to remove sulfur, arsenic and nitrogen, the Research octane number neat of the normally liquid product after the guard reactor should not exceed 70.

EXAMPLE

The naphtha feed is one obtained from Gulf Coast crude, has a gravity of 48.1° API, and has an initial boiling point of 202° F. and an end point of 394° F., both ASTM. The naphtha contains 55.5 percent by weight of naphthenes, 18.5 percent by weight of aromatics and 26.0 percent by weight of paraffins.

The catalyst used contains 0.6 percent by weight of platinum and 0.6 percent by weight of rhenium on an alumina base prepared in accordance with the teachings of U.S. Pat. No. 2,838,444 to Teter, Gring and Keith The base is composed of about 9 percent by weight of amorphous alumina, about 10 percent by weight of boehmite, about 28 percent by weight of bayerite, and about 53 percent by weight of nordstrandite plus gibbsite, and contains about 0.75 percent by weight of chloride. The catalyst is presulfided by passing through it at 750° F. and 100 psig a mixture composed of 99 percent by weight of hydrogen and 1 percent by weight of hydrogen sulfide. The mixture of hydrogen and hydrogen sulfide is passed through the catalyst until one atom of sulfur has been supplied for each atom of platinum and each atom of rhenium in the catalyst in the five beds.

The catalyst is disposed in five reactors which are arranged in series. The reaction system also includes five furnaces, one being located before the first reactor, the second being located between the first and second reactors, the third being located between the second and third reactors, the fourth being located between the third and fourth reactors, and the fifth being located between the fourth and fifth reactors. The weight hourly space velocity, based upon the total naphtha feed and the total weight of catalyst in the five reactors, is 2.5. The weight hourly space velocity in the first reactor, based upon naphtha feed, is 40. The weight hourly space velocity in the second reactor, based upon naphtha feed, is 35; the weight hourly space velocity in the third reactor, based upon naphtha feed, is 12; the weight hourly space velocity in the fourth reactor, based upon naphtha feed, is 8; and the weight hourly space velocity in the fifth reactor, based upon naphtha feed, is about 7.

The reaction system also includes a cooler and a separator after the fifth reactor in which the effluent from the fifth reactor is cooled and separated into a gaseous fraction containing hydrogen and some normally gaseous hydrocarbons (chiefly methane) and liquid reformate. A portion of the gaseous fraction is recycled to the first reactor in amount such that three mols of hydrogen are introduced into the first reactor in admixture with the fresh naphtha feed to be reformed. Similarly, a second portion of the gaseous fraction is recycled to the third reactor in the amount of 3 mols of hydrogen per mol of fresh naphtha feed introduced into the first reactor. The remainder of the gaseous fraction is withdrawn from the reforming system.

As has been stated, the reforming system is provided with five furnaces, one being located before each reactor. By means of these furnaces, the mixture introduced into the first reactor is maintained at 840° F., the temperature of the mixture introduced into the second reactor is maintained at 850° F., the temperature of the mixture introduced into the third reactor is maintained at 860° F., and the temperature of the mixture introduced into the fourth and fifth reactors is maintained at 925° F.

The inlet pressure to the first reactor is 200 psig. The total feed, including naphtha and gas recycled to the first and third reactors, contains 10 ppm of sulfur by weight. The hydrogen-containing recycle gas recycled to the first and third reactors includes 35 ppm of water vapor by volume. When the operation is carried out in this manner, there is produced a liquid reformate having a Research octane number neat of about 97.

It is claimed:

1. A process of reforming a petroleum naphtha containing from 40 to 60 percent by weight of naphthenes, from 5 to 25 percent by weight of aromatics and from 25 to 55 percent by weight of paraffins, which comprises passing the naphtha in admixture with hydrogen into contact with five beds of catalyst containing from 0.1 to 3 percent by weight of platinum and from 0.01 to 5 percent by weight of rhenium supported on a porous, solid base disposed in five beds arranged in series: the inlet temperature to the first bed being within the range from 800° to 880° F.; the inlet temperature to the second bed being within the range from 820° to 900° F.; the inlet temperature to the third bed being within the range from 820° to 1,000° F.; the inlet temperature to the fourth and fifth beds being within the range from 880° to 1,000° F.; the inlet pressure to the first bed being within the range from 100 to 300 psig; the weight hourly space velocity, based upon naphtha feed and the total amount of catalyst present in the five beds, being within the range from 2 to 6; the weight hourly space velocity in the first bed, based upon naphtha feed, being within the range from 20 to 60; the weight hourly space velocity in the second bed, based upon naphtha feed, being within the range from 15 to 50; the weight hourly space velocity in the third bed, based upon naphtha feed, being within the range from 7 to 40; the weight hourly space velocity in the fourth bed, based upon naphtha feed, being within the range from 3 to 20; the total amount of hydrogen introduced into the reforming process being within the range from 2 to 8 mols, based upon the mols of fresh naphtha feed; a portion of such hydrogen being introduced into the first bed and the remainder of such hydrogen being introduced into the third or fourth bed or both of them; and the sulfur content of the total feed to the beds being not more than 20 parts per million by weight.

2. The process of claim 1 wherein said porous, solid base is alumina.

3. The process of claim 1 wherein between one-third and two-thirds of the total amount of hydrogen introduced into all the beds is introduced into the first bed.

* * * * *